Feb. 9, 1960 W. KOPP ET AL 2,924,158
CAMERAS
Filed June 21, 1955 13 Sheets-Sheet 1

INVENTORS:
Wilhelm Kopp and
Hermann Ploss
By: Michael S. Striker
agt.

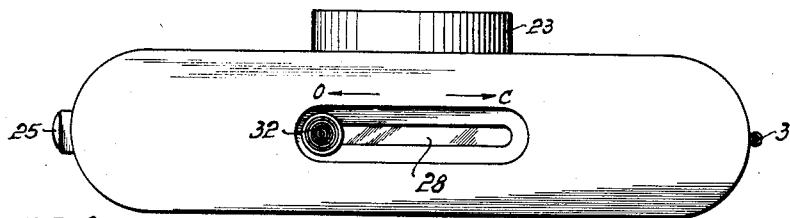
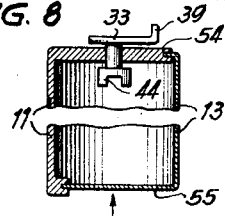
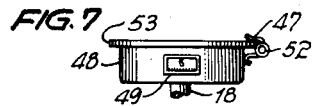
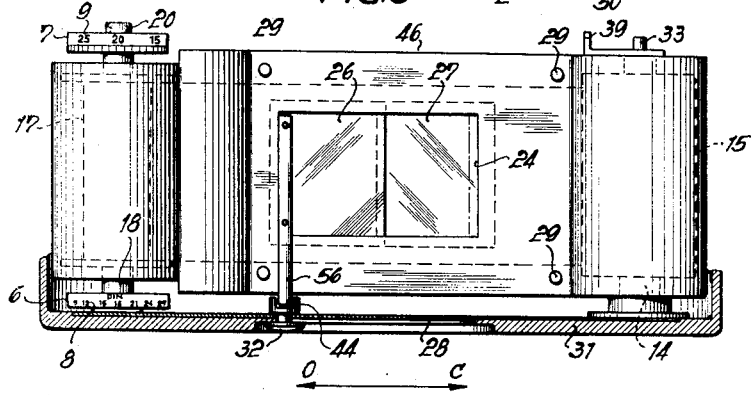
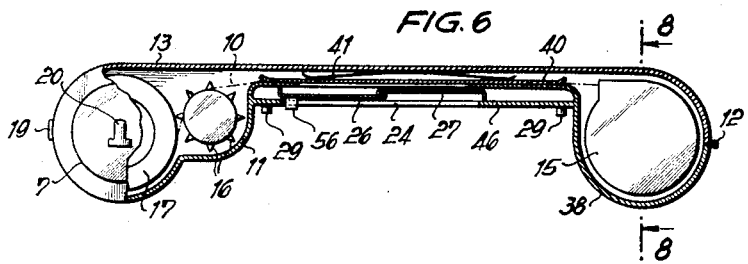

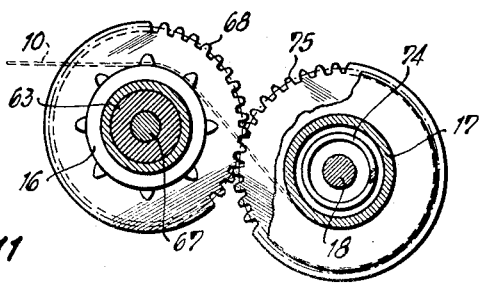
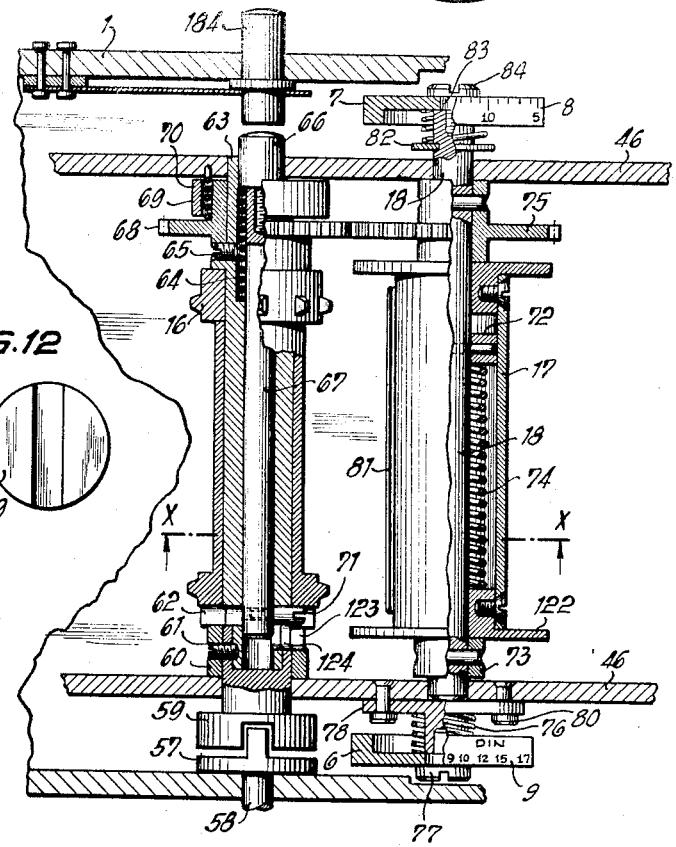

INVENTORS:
Wilhelm Kopp and
Hermann Ploss
By: Michael S. Striker
agt.

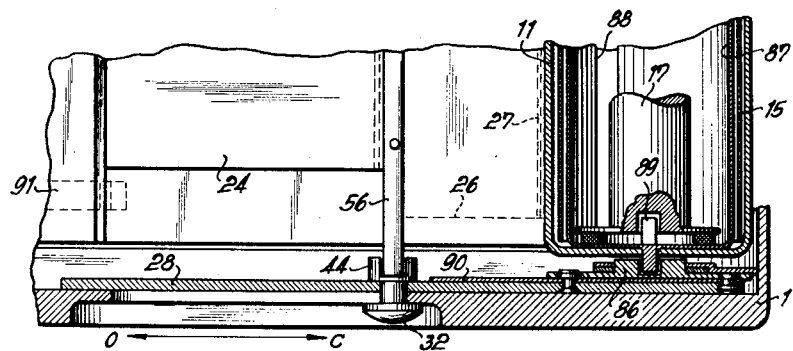
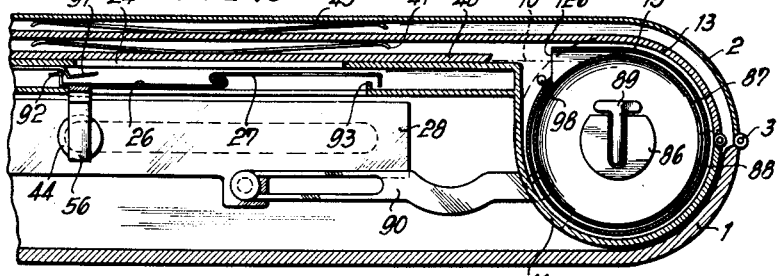
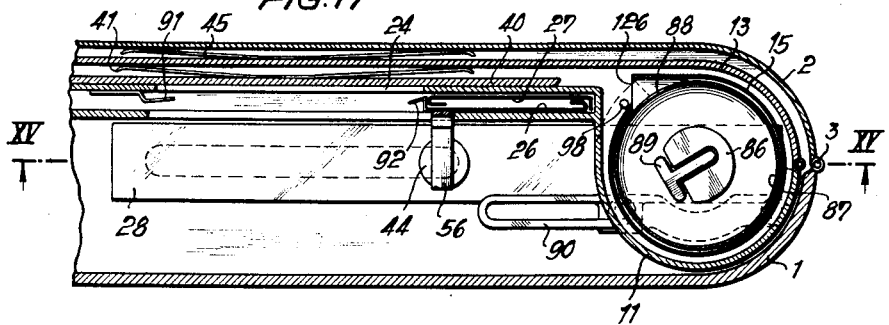

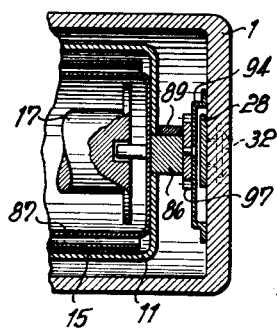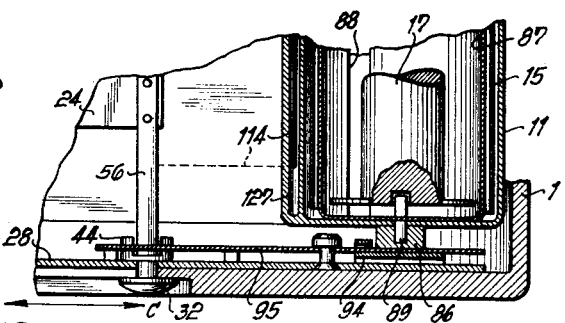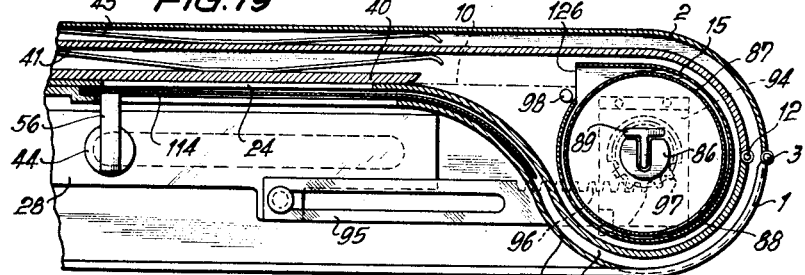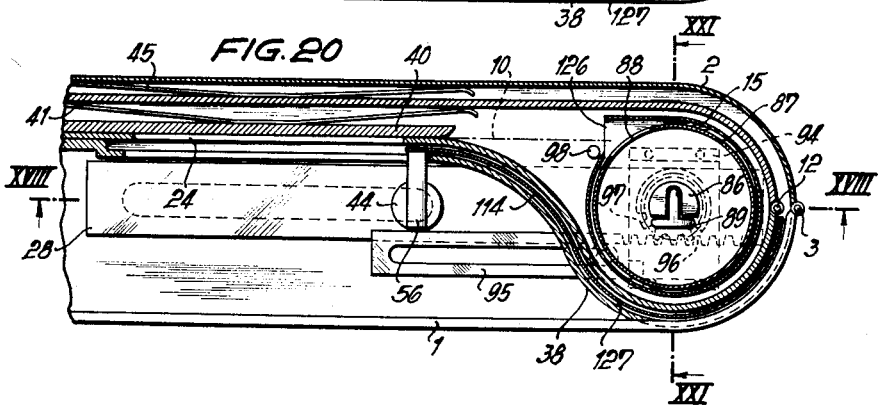

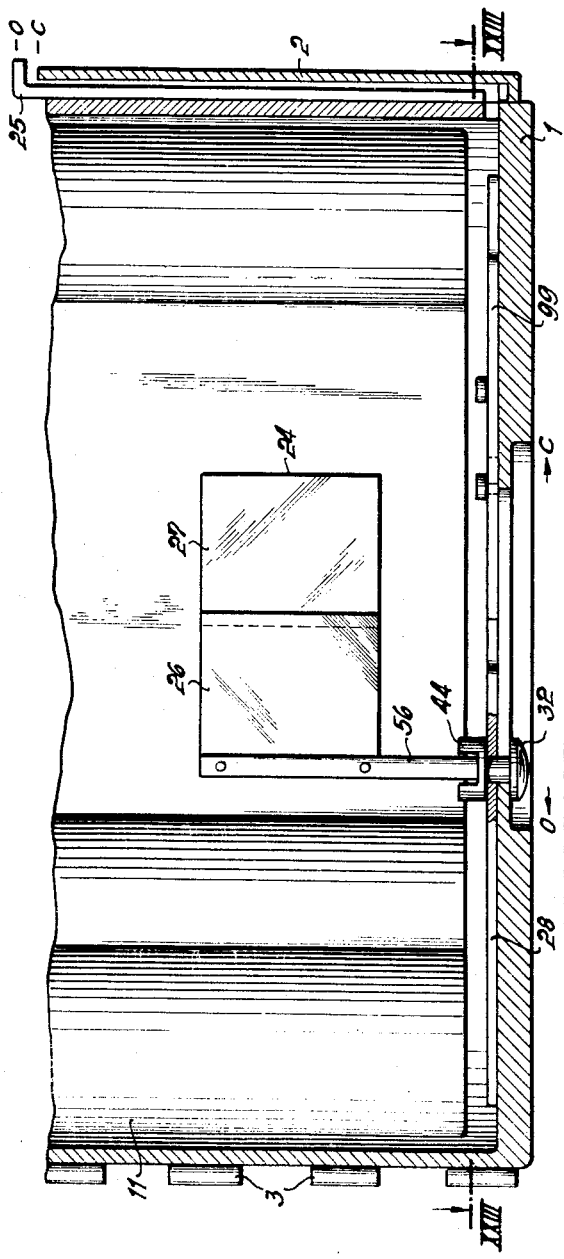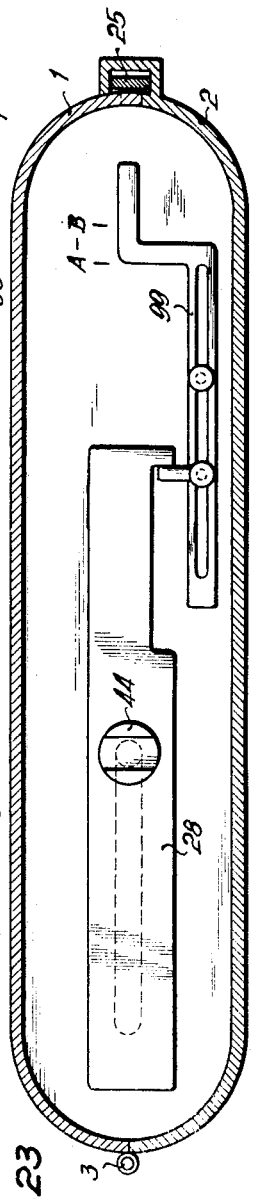

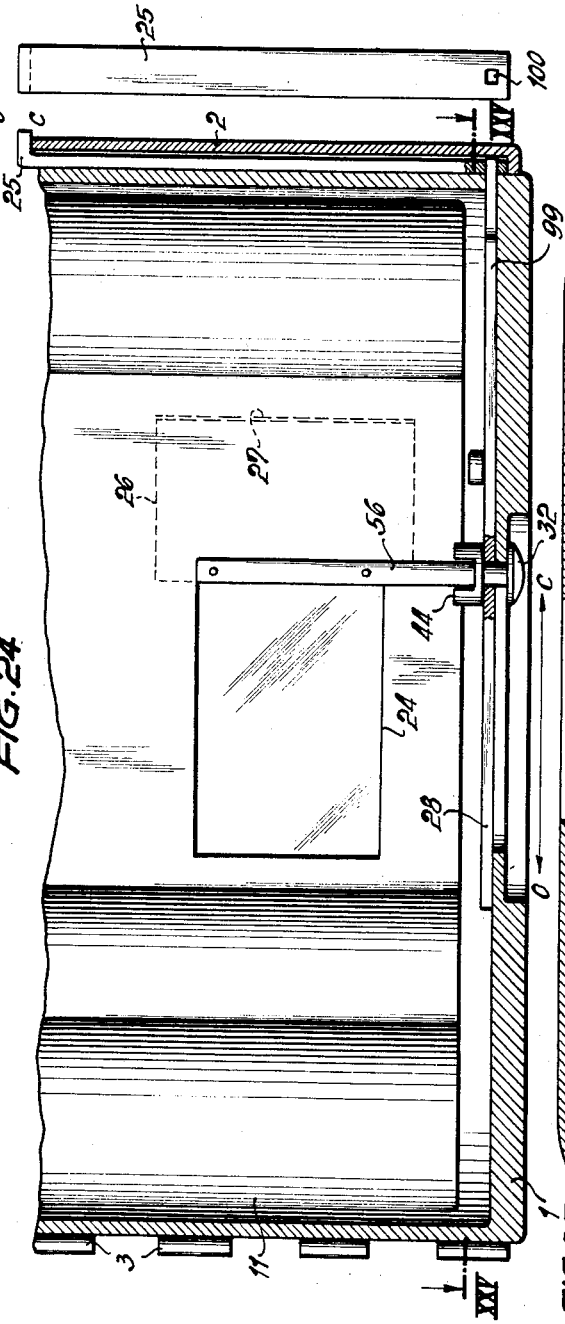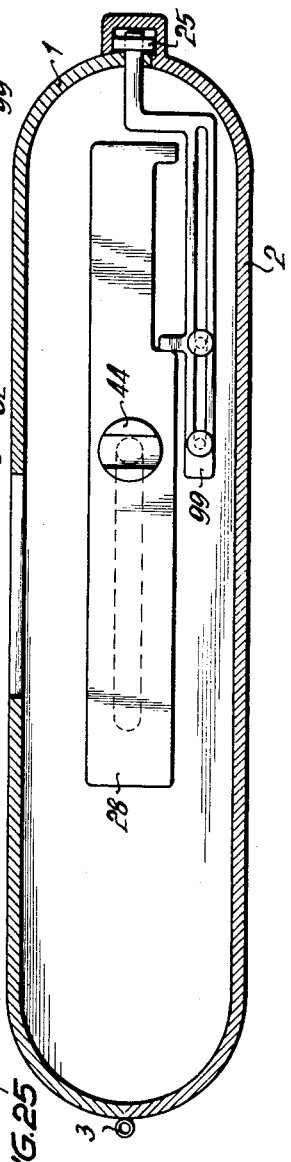

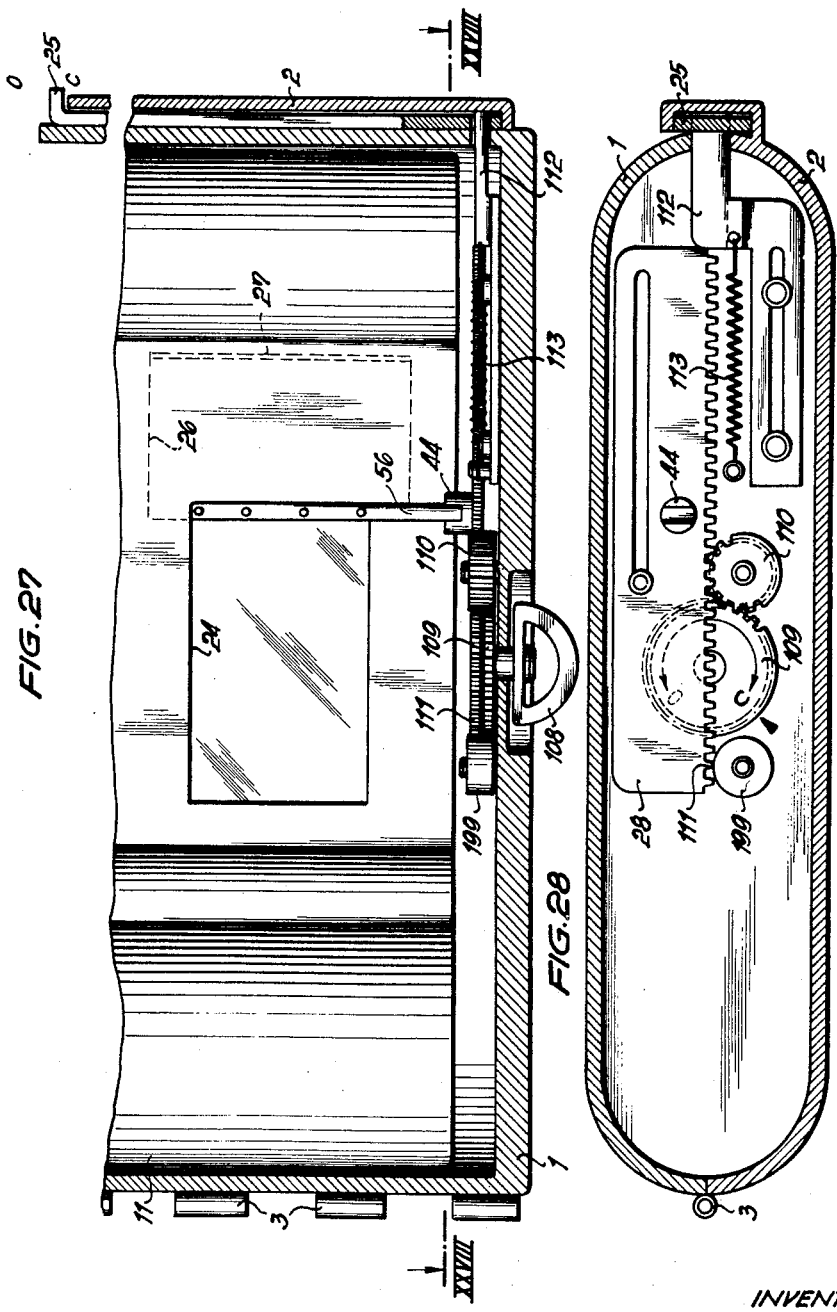

Feb. 9, 1960
W. KOPP ET AL
2,924,158
CAMERAS
Filed June 21, 1955
13 Sheets-Sheet 10
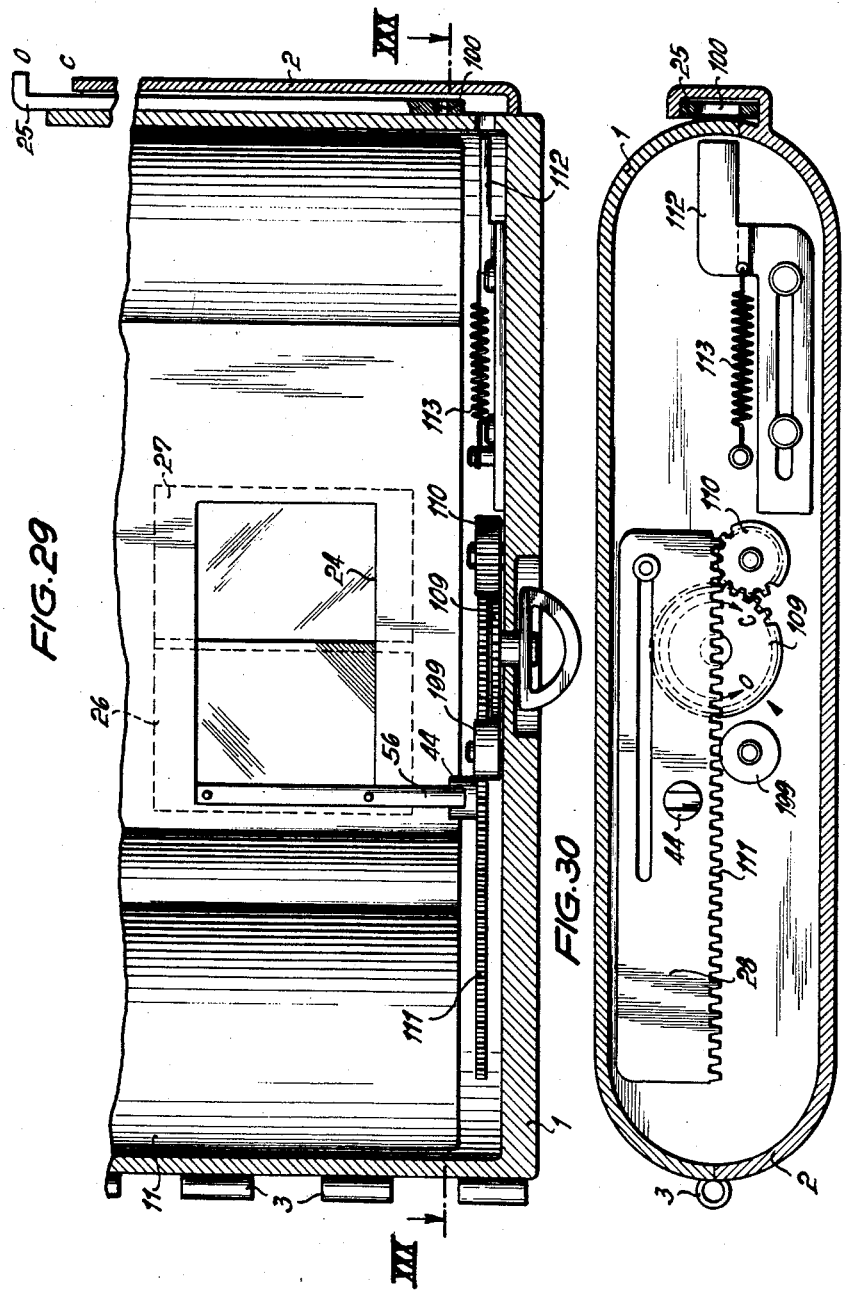
INVENTORS:
Wilhelm Kopp and
Hermann Ploss
By: Michael S. Struker
agt.

Feb. 9, 1960 W. KOPP ET AL 2,924,158
CAMERAS
Filed June 21, 1955 13 Sheets-Sheet 11
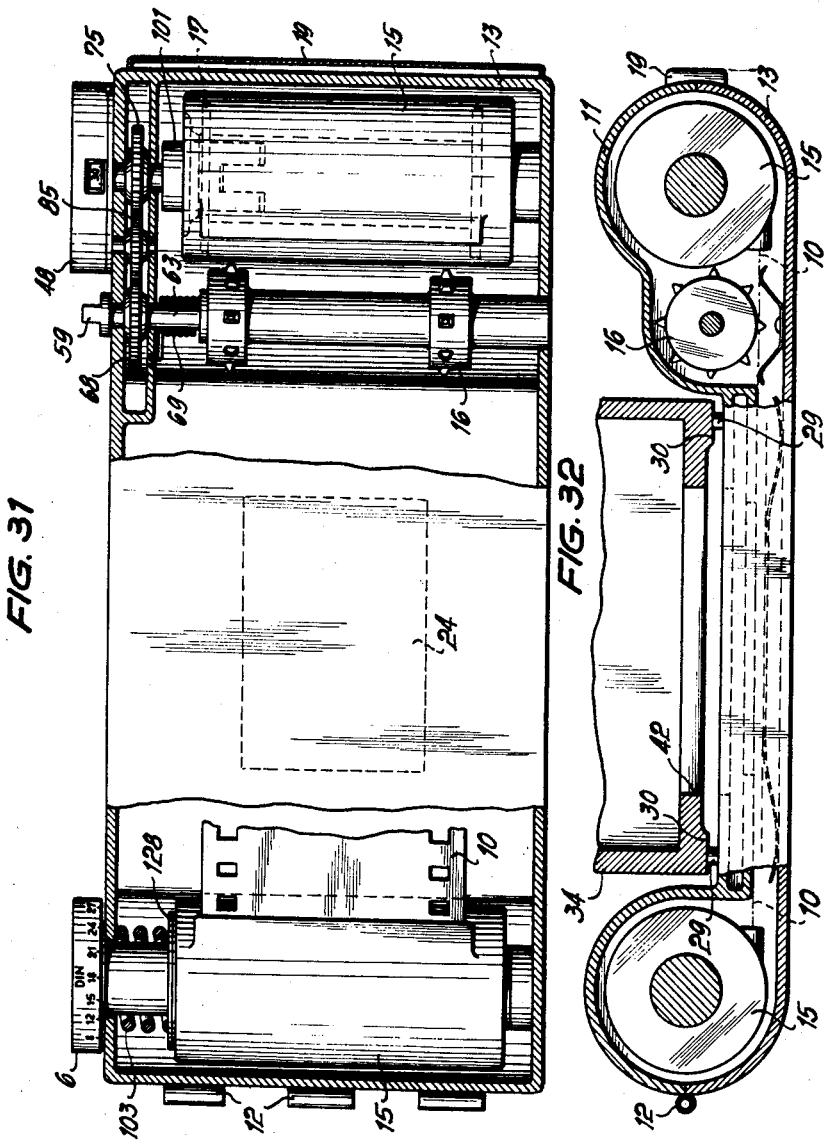
INVENTORS:
Wilhelm Kopp and
Hermann Ploss
By: Michael S. Striker
agt.

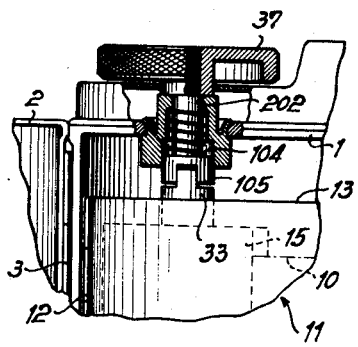
FIG.35
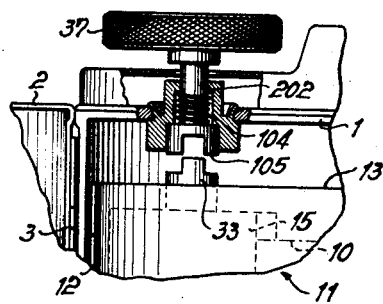
FIG.36
FIG.33
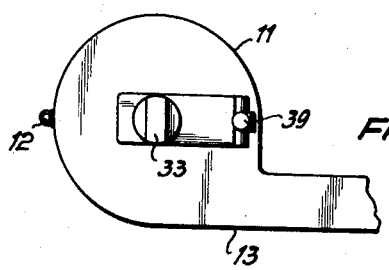
FIG.37
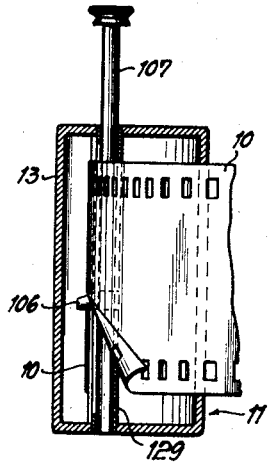
FIG.38
FIG.34
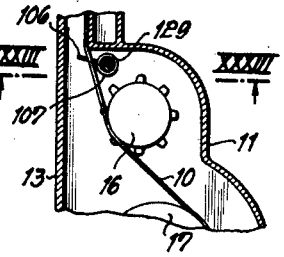
INVENTORS:
Wilhelm Kopp and
Hermann Ploss
By: Michael S. Striker
agt.

Feb. 9, 1960 W. KOPP ET AL 2,924,158
CAMERAS
Filed June 21, 1955 13 Sheets-Sheet 13

INVENTORS:
Wilhelm Kopp and
Hermann Ploss
By: Michael S. Striker
agt.

United States Patent Office 2,924,158
Patented Feb. 9, 1960

2,924,158

CAMERAS

Wilhelm Kopp, Wiesbaden-Bieberich, and Hermann Ploss, Frankfurt am Main, Germany, assignors to Adox-Kamarawerk G.m.b.H., Wiesbaden-Beiberich, Germany Application June 21, 1955, Serial No. 516,886

Claims priority, application Germany June 21, 1954

5 Claims. (Cl. 95—31)

The present invention relates to cameras.

More particularly, the present invention relates to a portable camera, a magazine used in the same, and the relationship between components of the camera and magazine.

Inasmuch as film in removable camera magazines must be accurately positioned during exposure, it is necessary to position such magazines very accurately. On the other hand these magazines must also be movable to and from the position where they cooperate with the camera. As a result, very accurately formed surfaces of a new camera which properly position a magazine in the camera easily become worn and after a relatively short period of time the magazine is no longer positioned with the required accuracy. Furthermore, conventional magazines may through carelessness be removed from the camera in a manner which undesirably exposes film in the magazine. Also, with conventional cameras the movement of the film in the magazine is not correlated with the operation of the components of the camera in a manner which prevents absolutely the undesired operation of the camera.

One of the objects of the present invention is to overcome the above drawbacks by providing a means for accurately positioning a magazine on a camera and which will never become worn irrespective of how many times the magazine is moved to and from the position where it cooperates with the camera.

Another object of the present invention is to provide a means which guarantees that the magazine is fully closed whenever it is removed from the camera.

A further object of the present invention is to provide a means which opens a part of the magazine for exposure of film therein only when a camera housing in which the magazine is located is locked against opening for removal of the magazine.

It is also an object of the present invention to guarantee that parts of the magazine which cooperate with the parts of the camera are properly positioned with respect to each other whenever the magazine is inserted into or removed from the camera.

It is an additional object of the present invention to provide a magazine with a film counter disc as well as a disc for reminding the user of the type of film in the magazine.

A still further object of the present invention is to provide a magazine with a means for rewinding film therein.

Still another object of the present invention is to provide a manually releasable means for preventing removal of the magazine from the camera housing except when a given cycle of picture-taking operations has been completed.

Yet another object of the present invention is to provide a magazine with a releasable means for preventing opening of the magazine except when film therein has been unwound from and rewound on a supply spool in the magazine.

Also, it is an object of the present invention to prevent operation of components of the camera such as the shutter thereof, for example, except when such operation is correlated properly to the position of film in the magazine.

Furthermore, it is an object of the present invention to provide structure capable of accomplishing all of the above objects and at the same time made up of simple, ruggedly constructed elements which are inexpensive to manufacture and which are very reliable in operation.

With the above objects in view the present invention mainly consists of a camera which includes a camera housing formed with an opening giving access to the interior of the camera. A closure means has an operative position closing this opening and an inoperative position uncovering this opening. A magazine is located in the housing and is removable through the above opening thereof when the closure means is in its inoperative position. This magazine is formed with an aperture through which the film in the magazine may be exposed, and the magazine includes an opaque screen means movably carried by the magazine for movement between a closed position closing the magazine aperture and an open position opening this aperture. A means is operatively connected to the screen means for moving the same to its open position and locking the closure means in its operative position, on the one hand, and for moving the screen means to its closed position and releasing the closure means for movement to its inoperative position, on the other hand.

The novel features which are considered as characteristic for the invention are set forth in particular in the appended claims. The invention itself, however, both as to its construction and its method of operation, together with additional objects and advantages thereof, will be better understood from the following description of specific embodiments when read in connection with the accompanying drawings, in which:

Fig. 4 is a view of a camera according to the present invention as seen from below the camera and showing part of the means which is operable to prevent opening of the closure of the camera;

Fig. 5 is a front view of a magazine according to the invention with its exposure aperture closed, Fig. 5 also showing fragmentarily and in section the bottom wall of the camera and the means for locking the closure of the camera;

Fig. 6 is a partly sectional plan view of a magazine according to the present invention provided with telescoped cover plates for screening the exposure aperture of the magazine, Fig. 6 also showing a coupling member of the film transporting mechanism of the magazine;

Fig. 7 shows a container having a hinged cover and in which the counter disc is located to prevent undesired movement of the counter disc;

Fig. 8 is a fragmentary sectional view taken along line VIII—VIII of Fig. 6 in the direction of the arrows;

Fig. 9 is a fragmentary sectional view of part of the container of Fig. 7 and part of the camera housing which cooperates with the same;

Fig. 10 is a sectional view taken along line X—X of

Figure 13:
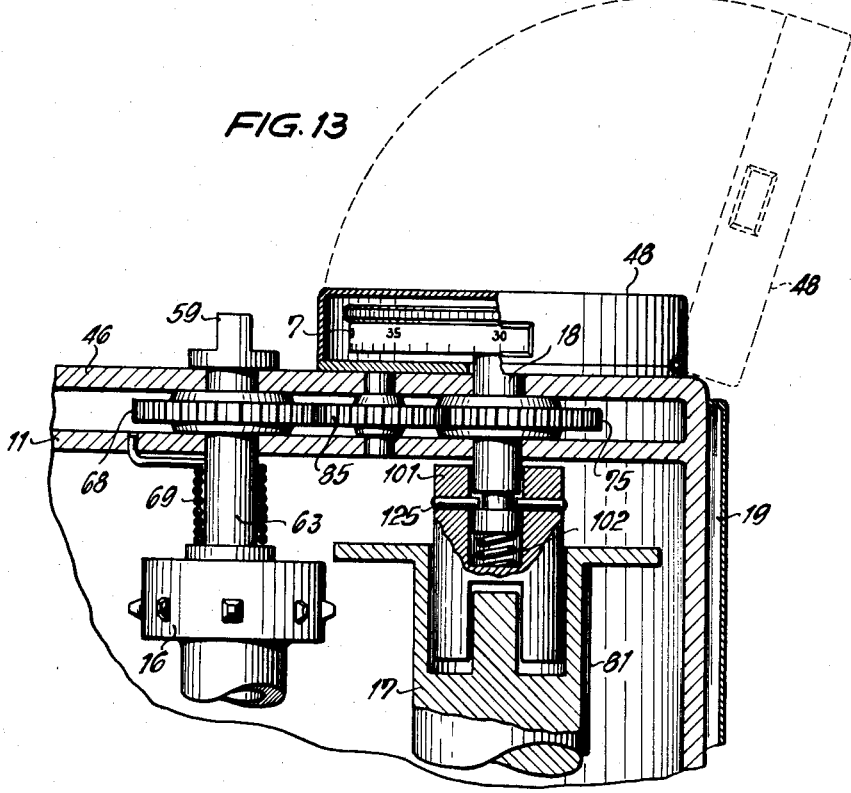
Figure 14:
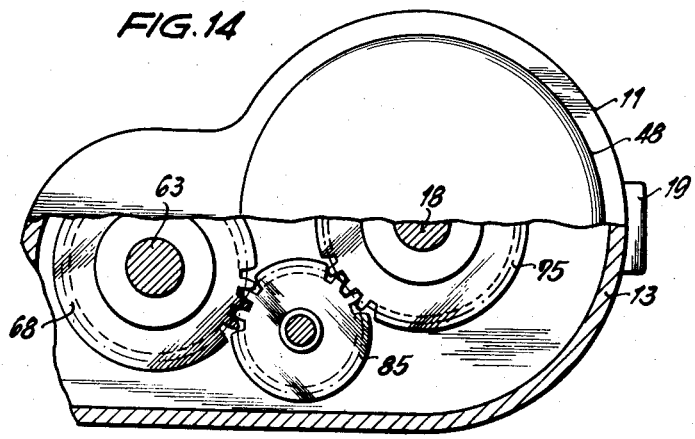
Figures 39, 40:
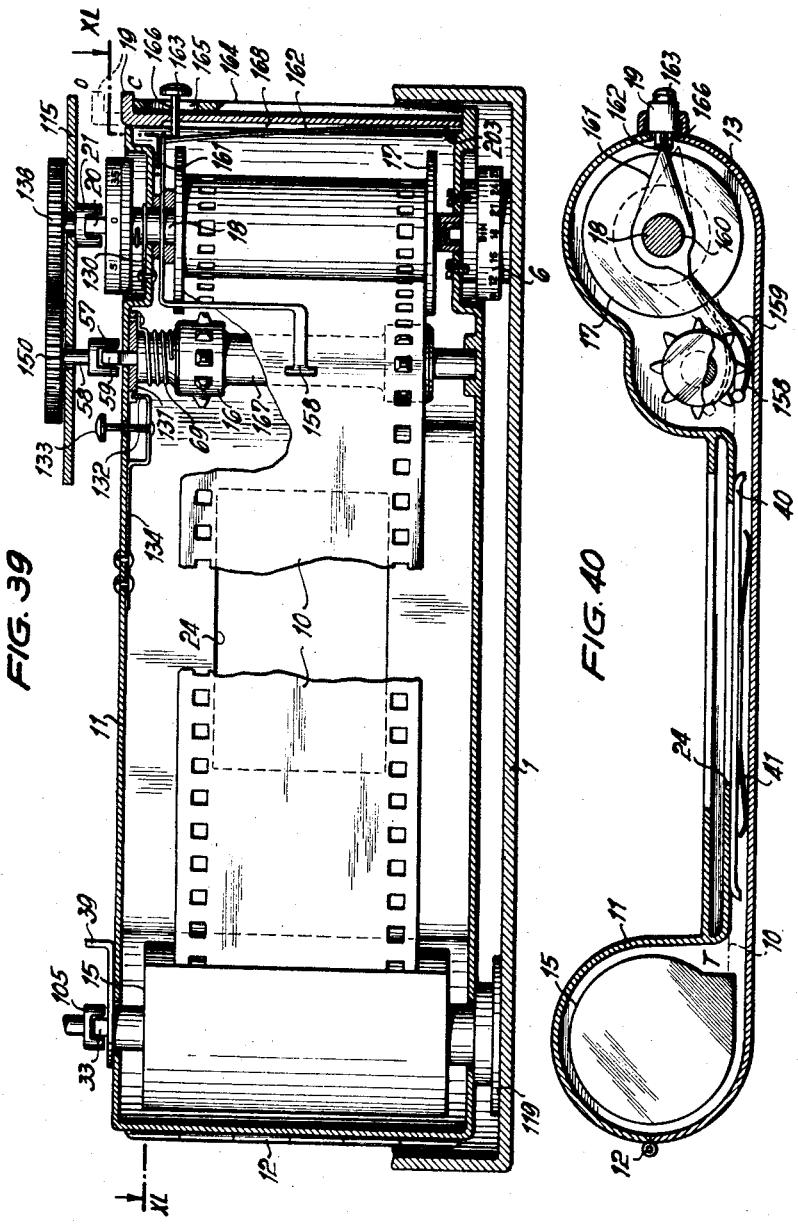

Fig. 11 in the direction of the arrows and showing gearing of the film transporting means;

Fig. 11 is a fragmentary partly sectional elevational view of part of the film transporting structure together with controls therefor, Fig. 11 also showing the counter and film characteristic indicating discs and the manner in which they are operatively connected to the magazine;

Fig. 12 is a view from below of a coupling element for transmitting motion between the parts of the film transporting mechanism carried by the camera housing and magazine;

Fig. 13 is a fragmentary partly sectional elevational view showing part of the film transporting structure as well as the manner in which the counter disc is mounted and driven;

Fig. 14 is a partly sectional fragmentary top plan view of gears located just beneath the top wall of Fig. 13;

Fig. 15 is a fragmentary partly sectional front elevational view showing a special film cartridge within the magazine in an open position and the manner in which structure for controlling this film cartridge is connected with the structure for opening and closing the screen means of the magazine, Fig. 15 being taken along line XV—XV of Fig. 17 in the direction of the arrows;

Fig. 16 is a sectional top plan view of the structure of Fig. 15 showing both the film cartridge and the exposure aperture of the magazine in their closed positions;

Fig. 17 shows the same structure as Fig. 16 with the film cartridge and magazine exposure aperture in their open positions;

Fig. 18 is a fragmentary, front sectional view taken along line XVIII—XVIII of Fig. 20 in the direction of the arrows and showing the manner in which a special film cartridge of the type shown in Figs. 15–17 is associated with structure for operating a magazine screen means in the form of an elongated flexible sheet;

Fig. 19 is a sectional top plan view of the structure of Fig. 18 and shows the film cartridge and magazine exposure aperture in their closed positions;

Fig. 20 shows the structure of Fig. 19 with the film cartridge and magazine exposure aperture in their open positions;

Fig. 21 is a fragmentary sectional view taken along line XXI—XXI of Fig. 20 in the direction of the arrows;

Fig. 22 is a fragmentary elevational view showing the magazine as seen from the front as well as the camera housing in section and showing the structure which operates the screen means for closing and opening the magazine exposure aperture and which at the same time locks or releases the lock of the camera housing;

Fig. 23 is a sectional plan view taken along line XXIII—XXIII of Fig. 22 in the direction of the arrows;

Fig. 24 shows the structure of Fig. 22 with the magazine exposure aperture opened and with the camera housing lock blocked against movement to its unlocking position;

Fig. 25 is a sectional plan view taken along line XXV—XXV of Fig. 24 in the direction of the arrows;

Fig. 26 is an elevational view of the lock member of the camera housing and shows the opening through which a blocking member extends;

Figs. 27 and 28 are views corresponding respectively to Figs. 22 and 23 but showing a different embodiment of a structure for operating the screen of the magazine exposure aperture and blocking the lock, Fig. 28 being taken along the line XXVIII—XXVIII of Fig. 27 in the direction of the arrows;

Figs. 29 and 30 are views corresponding respectively to Figs. 27 and 28 but showing the parts in the position which they assume when the magazine exposure aperture is closed and the camera lock is released for movement to its unlocking position, Fig. 30 being taken along line XXX—XXX of Fig. 29 in the direction of the arrows;

Fig. 31 is a fragmentary elevational view from the rear of another embodiment of a magazine according to the present invention in which film moves between a pair of film cartridges, the magazine of Fig. 31 including the gearing and counter container of Figs. 13 and 14 and Fig. 31 also showing the film characteristic indicating disc;

Fig. 32 is a fragmentary sectional plan view of the structure of Fig. 31 shown in association with the objective housing and exposure aperture of the camera, Fig. 32 showing in particular the structure for determining the position of the magazine within the camera housing;

Fig. 33 is a sectional elevational view taken along line XXXIII—XXXIII of Fig. 34 in the direction of the arrows and showing structure incorporated into the magazine for cutting a film strip;

Fig. 34 is a sectional plan view of the structure of Fig. 33;

Fig. 35 is a fragmentary partly sectional elevational view from the rear showing the magazine within the camera and illustrating the operative connection between a film spool and the rewinding knob;

Fig. 36 shows the structure of Fig. 35 with the rewinding knob raised to an inoperative position where it is uncoupled from the film spool;

Fig. 37 is a fragmentary partly sectional elevational view from the rear showing a rewinding crank of the magazine in its operative position;

Fig. 38 is a top plan view of the structure of Fig. 37;

Fig. 39 is a sectional elevational view from the rear of a magazine according to the invention shown operatively connected to a film transporting mechanism carried by the camera housing, Fig. 39 also showing structure for locking the magazine; and Fig. 40 is a sectional plan view of the magazine of Fig. 39 illustrating the structure for locking the magazine when film is located in the same, Fig. 40 being taken along line XL—XL of Fig. 39 in the direction of the arrows.

Figure 1:
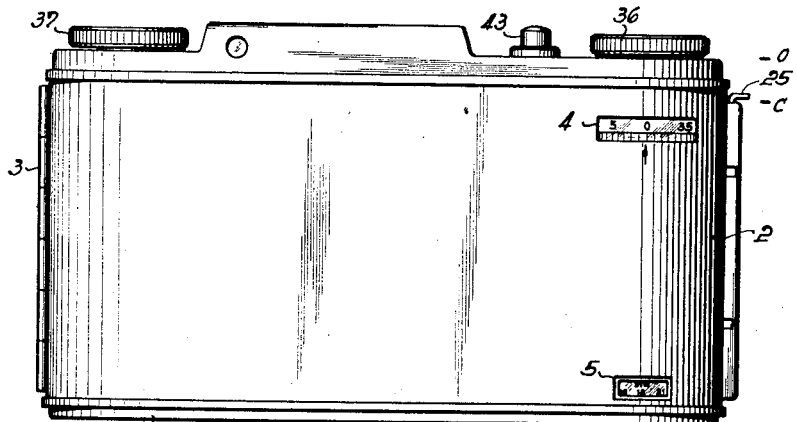
Fig. 1 is a view of a camera according to the present invention as seen from the rear with a counter disc and a film characteristic indicating disc of a magazine in the camera visible through the rear wall thereof.
Figure 2:
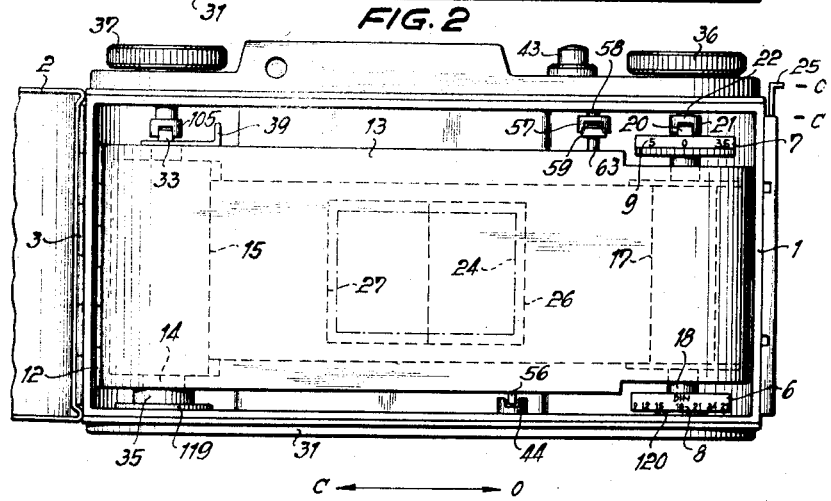
Fig. 2 is also a view of a camera according to the present invention as seen from the rear, but in Fig. 2 a closure means formed by the rear wall of the camera is in its inoperative open position showing the magazine within the camera housing.
Figure 3:
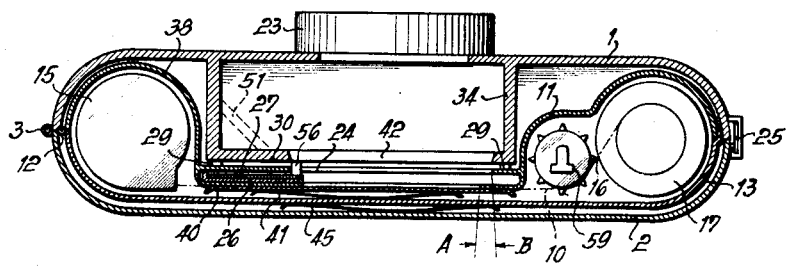
Fig. 3 is a sectional plan view taken beneath the top wall of the camera and showing the magazine therein.

Referring now to the drawings and more particularly to Figs. 1–3, the camera of the invention includes a housing composed of a front wall 1 and formed with an opening giving access to the interior of the camera housing. This opening is closed by a closure means taking the form of the rear wall 2 of the camera which is preferably hinged to the camera housing at 3. This rear wall 2 is provided with transparent windows 4 and 5 through which a counter disc 7 and a film characteristic indicating disc 6 are visible, these discs being carried by the removable magazine 11, 13. The windows 4 and 5 are preferably provided with magnifying lenses and the indicia 8 and 9 are preferably made of a luminescent material. With this construction no light can reach the film 10 through the windows 4 and 5, this film 10 being located within the magazine. Preferably a conventional light trap labyrinth may be used for this purpose.

Fig. 2 shows the camera housing with the closure means formed by rear wall 2 located in its inoperative position. Thus, the magazine 11, 13 within the camera is visible. This magazine is preferably provided with a rear wall 13 hinged at 12 to the remainder of the magazine, and preferably the magazine is constructed so that the discs 6 and 7 are located at the exterior of the magazine when the rear wall 13 thereof is closed, so that these discs 6 and 7 are visible and adjustable when the magazine is closed. This arrangement makes is possible to adjust these discs in daylight without exposing the film, which is of particular advantage when using with the magazine film which must be placed in the magazine in a dark room.

As is shown in Fig. 7, a container 48 having a spring pressed cover hinged thereto at 52 protects the disc 7 located therein against unforeseen adjustment. The same arrangement may be provided for the disc 6 which indicates the characteristics of the particular film in the magazine. The window 4 (Fig. 9) is located at a part of the rear wall 2 which extends inwardly in the form of a tube 50, and when the camera housing is closed this tube 50 extends into an opening 49 of the container 48. The window 5 may be formed in the same way as the window 4. In this way light is not permitted to reach the film 10.

Within the magazine 11, 13 there is a bearing 14 for a conventional film cartridge 15 or for a film spool provided with blank ends which allow it to be placed within the magazine in broad daylight. It is also possible to accommodate special film cartridges 15 in the magazine, such a special film cartridge being coupled to the lock member 19 of the magazine rear wall 13 in such a way that when the magazine is closed with this lock member the special film cartridge is simultaneously opened. This will be apparent from the description below in connection with Figs. 15–20.

Also, a film transporting sprocket 16 is located within the magazine and is in driving connection with the film spool 17 as well as with its shaft 18, or the sprocket 16 may be turned by movement of the film, in such a way that the sprocket 16 controls the step by step advancing of the film. This control can be provided either through the cooperation of the sprocket 16 with the perforations of the film 10 or through a measuring role operating by friction and cooperating with unperforated film. Also it is possible to obtain this control with a cam drive operating on the shaft 18 of the spool 17.

At the upper portion of the magazine 11, 13 there is a structure for operatively connecting the film transporting structure of the magazine with film transporting structure of the camera. This structure includes coupling elements 20 and 59 respectively carried by shafts 18 and 63 and having motion transmitting surfaces which engage mating motion transmitting surfaces of coupling elements 21 and 57, respectively, of the film transporting gear train 115 (Fig. 39) of the camera, these latter coupling elements being fixed to and carried by shafts 22 and 58, respectively. These coupling elements are placed in operative engagement with each other when the magazine is inserted into the camera housing so that when the drive 115 operates the shaft 18 and/or the shaft 63 of the magazine 11, 13 are automatically turned. Instead of this arrangement it is possible to provide only the coupling member 57 for cooperating with the coupling member 59 when shaft 18 of film spool 17 and shaft 63 of sprocket 16 are in driving engagement through the gears 68, 75 within the magazine, as shown in Figs. 10 and 11.

In order to place the magazine into or remove it from the camera housing it is necessary to release the shutter by depressing the shutter release plunger 43 (Fig. 2). It is possible to form a part of the drive 115 in such a way that it participates in the movement of the shutter and in the armed position of the shutter prevents insertion of the magazine into or removal of the magazine from the camera housing 1, 2. However it is also possible to arrange this device in such a way that the lock for preventing insertion or removal of the magazine when the shutter is armed is not located on the shaft 22 and/or 58 of the drive 115 but instead operates, for example, on a pawl or hook located on the magazine 11, 13.

In order to prevent movement of the film in the magazine when the latter is in the camera housing and when the exposure aperture of the magazine is closed, a blocking of the lock member 25 which locks the closure 2 in its operative position is correlated with the structure for moving an opaque screen means between positions covering and uncovering the exposure aperture 24 of the magazine in such a way that when the lock member 25 is thus blocked the opaque screen means uncovers the exposure aperture 24. This opaque screen means is composed either of a pair of telescoped cover plates 26 and 27 or of a flexible, bendable elongated sheet 114. The blocking of lock member 25 in its locking position is provided by a pusher bar 28 simultaneously with the opening of the cover plates 26, 27 or the movement of the sheet 114 to its open position, bar 28 being manually moved by means of a button fixed to the bar 28. When this button 32 is moved to the C position (Fig. 5) the lock member 25 is blocked and the exposure aperture 24 is opened. Fig. 4 shows the button 32 located at the O (open) position. When the button is in this position it signifies that the lock member 25 is released and may be actuated for opening the camera. At this time the exposure aperture 24 of the magazine is closed. Thus at this time the lock member 25 may be raised so that the rear wall 2 of the camera may be turned to open the camera housing. The structure is so designed that the actual blocking or release of the lock member 25 takes place during movement of the bar 28 through the path A—B (Fig. 3). The details of this mechanism are illustrated in Figs. 22–25 on an enlarged scale. Thus, these figures show how the button 32 which is connected to the bar 28 is fixed to a coupling member 44 into a recess of which a bar 56 fixed to cover plate 26 extends, this button 32 being slidable along a slot formed in the bottom wall of the housing 1. As is apparent from Figs. 23 and 25 when the bar 28 approaches the end of its movement uncovering the aperture 24 the bar 99 is engaged by the bar 28 to be moved to the right from the position of Fig. 23 to that of Fig. 25, and in this position the right free end of the bar 99 extends through the opening 100 (Fig. 26) of the lock member 25 in order to block the same. The lock member 25 is located in a channel-shaped extension of cover 2, and inasmuch as bar 99 is fixed to the housing 1 the camera housing cannot be opened when the parts have the position shown in Figs. 24 and 25. It is of course also possible to simply provide the bar 28 with an extension fixedly connected to the same for blocking lock 25 when aperture 24 is uncovered and for releasing lock 25 when aperture 24 is closed by the screen means 26, 27 or 114.

In order to provide for the covering and uncovering of exposure aperture 24 an opaque screen means is provided which is of a simple uncomplicated construction requiring little space and composed of rigid cover plates and requiring no additional oppositely moving motion transmission elements cooperating with the bar 28, one form of this screen means taking the form of two or more rigid plates 26 and 27 which are telescopically movable into or out of each other and which provide a light trap with their curved intermeshing edges. As is apparent from Figs. 16 and 17 the magazine is provided with a hollow frame portion in which the plates 26 and 27 are slidably guided and when the screen means 26, 27 is moved from the closed position of Fig. 16 to the open position of Fig. 17 the plate 27 engages the right edge of this frame portion to stop moving before the cover plate 26 reaches the end of its movement, and this plate 26 then continues to move until it fully overlaps the plate 27, as shown in Fig. 17. Figs. 16 and 17 show how a light trap is provided at the lateral edges of cover plates 26 and 27. A light trap is provided at the top and bottom edges of these plates either by thickening of these edges or by curving them angularly. The telescoped cover plates 26 and 27 may ride on balls or rollers, if desired.

In order to accurately determine the position of the magazine within the housing, the objective housing 34 formed with the exposure aperture 42 (Figs. 3 and 32) has a surface 30 directed toward the front of the magazine at parts thereof spaced from the exposure aperture 24 of the magazine, and spacers 29 are located between objective housing 34 and the magazine. These projections 29 may be carried by the magazine and engage the surface portions 30 or they may be carried by surface portions 30 and engage the magazine. In either event the projections 29 may be threadedly mounted so as to be adjustable, and if desired they may extend into mating recesses to determine the location of the magazine, not only in the direction of the optical axis, but also in a direction transverse to the optical axis. As is apparent from Fig. 3, the rear wall 2 carries a leaf spring 45 which engages the magazine to urge the same forwardly in the direction of the optical axis when the camera housing is closed so that the projections 29 have no play and accurately determine the position of the magazine. Except for the precise location of the magazine provided by the members 29, all other tolerances need not be strictly maintained so that no difficulty is involved in providing interchangeable magazines. The magazine 11, 13 is retained in the camera housing 1, 2 against movement out of the optical axis as a result of its support at the bottom by the member 119 (Fig. 2) and 120 at the top by the members 105, 57 and 21.

The operation of the above-described camera structure is as follows:

The button 32 is placed in its O position and then the lock member 25 is raised upwardly to its unlocking position shown in Fig. 22. In this way the rear wall of the camera is unlocked and may be opened. Then the magazine 11, 13 is inserted into the camera housing 1, 2 the rear wall 2 is closed and locked by the member 25 which passes downwardly through an opening of a rigid portion of the camera housing 1, and the button 32 at the bottom wall 31 of the camera housing, which button may take the form of a lever, disc, or the like, if desired, is shifted to the C position. In this way as is apparent from Figs. 24 and 25 the lock 25 is blocked so that it cannot be raised. At the same time the screen means 26, 27 or 114 (Figs. 19 and 20) is moved to its open position uncovering the exposure aperture 24 of the magazine. Where a flexible sheet 114 is used instead of cover plates 26 and 27, then as is shown in Figs. 19 and 20 the sheet 114 is guided in a guide 127 formed in part by the wall 38 of the magazine. The opening of the screen means simultaneously releases the film transporting drive 115 for movement. It is now possible to actuate the elements which operate the shutter 23 and the film is transported by one film frame in the magazine after each exposure. After each exposure or release of the shutter 23 the magazine 13, 11 can be removed from the camera housing 1, 2. For this purpose the button 32 is returned to its O position. The bar 28 prevents light from entering the camera housing 1, 2 in all positions of the button 32. By locating the button 32 in its O position the screen means 26, 27 or 114 is placed in its closing position covering the aperture 24 and at the same time the lock member 25 is released. By raising lock member 25 the closure means 2 may be turned to its inoperative position and it is now possible to remove the magazine from the camera housing in broad daylight, and then the magazine may be reinserted into the housing or a different magazine may be placed in the housing. In each case exposure of the next film frame will automatically take place after the magazine is again located in the camera housing and after the above mentioned lock 25 is blocked by movement of the button 32 to its C position. As was pointed out above the operation of elements 28 and 25 guarantee that the drive 115 is released for movement by disengagement of element 121 therefrom only when the magazine is in the camera with exposure aperture 24 uncovered and with member 25 blocked. Thus, it is impossible to transport the film 10 in the magazine until the closure means 2 is blocked, when the magazine is in the camera. Releasable drive 115 not only permits transporting of the film but also it permits arming of the shutter 23.

A daylight film cartridge 15, as shown in Figs. 2, 3, 5 and 6, may be placed within the magazine and the film 10 may be wound on the take-up spool 17 and then rewound in the cartridge 15 in order to be removed. The rewinding structure or the structure which allows the spocket 16 to turn freely during rewinding is shown in section in Fig. 11. The increasing spool diameter of the take-up spool 17 is compensated by a friction clutch formed by the friction spring 74. According to a different system a pair of daylight film cartridges 15 may be used, as shown in Figs. 31 and 32. In this case rewinding of the film 10 into its original cartridge 15 is unnecessary. For the case where the film is transported between a pair of cartridges 15 a film cutting device illustrated in Figs. 33 and 34 is provided so that it is possible to cut the exposed film without opening the magazine 11, 13, and then the film may be wound up in the take-up cartridge 15.

Figs. 15–20 show an arrangement which makes it possible to use the movement of the bar 28 in order to automatically open a film cartridge 15 when the rear wall 2 is locked and in order to automatically close a film cartridge 15 when the camera housing is opened. For this purpose daylight film cartridges of a special construction may be used.

In Fig. 10 the drive which controls the operation of the counter is shown. The gear 68 has for example 39 teeth and when each film frame is advanced this gear 68 turns through a single revolution. The gear 68 meshes with the gear 75 which has for example 40 teeth. In a known way the gear 75 remains behind by one tooth at each revolution of the gear 68. The counter disc 7 on the shaft 18 has 40 uniformly distributed graduations. The position of the counter disc may be read by an index on the magazine. Each graduation of the disc 7 corresponds to a film frame and the gap between a pair of film frames. The film 10 is transported by the sprocket 16 and is wound onto the spool 17. The friction spring 74 bears at one end on a ring 72 fixed to the shaft 18 and at its other end against the flange 122 of the spool, this flange being pressed against the ring 73 which is fixed to the shaft 18. The film spool itself is freely turnable on the shaft 18. The gear 75 is also fixed to the shaft 18. This shaft 18 is freely turnable in the housing 46 of the magazine 11, 13 and is prevented from turning in the reverse direction by cooperation of the gear 68 with a one-way drive spring 69. The disc 7 is freely turnable on the shaft 18 but is engaged by the friction spring 83. This friction spring 83 presses at one end against the ring 82 and at its other end against the counter disc 7 which is held in position by the screw 84. Thus, the disc 7 is turnable against the action of the friction spring 83. A leaf spring 81 is carried by the spool 17 for clamping the film 10 to the same. At the other side of the housing 46 of the magazine 11, 13 a flange 78 is fixed by rivets 80. A friction spring 76 presses on the one hand against the flange 78 and on the other hand against the disc 6 which indicates the particular type of film in the magazine, this disc 6 being freely turnable on the flange 78 and being held thereon by the screw 77. In this way the disc 6 is adjustable with respect to an index on the magazine 11, 13. The one-way drive spring 69 is protected by a sleeve 70.

The sprocket 16 includes a hollow shaft 63 joined by the set screw 61 with the coupling element 59 and the ring 60. This ring 60 is formed with a slot 123 in which a screw 71 extends. This screw 71 is connected to an elongated coupling pin 67 provided at its top end with a pressure knob 66. A spring 64 engages the knob 66 and a shoulder of the hollow shaft 63 so that the pin 67 is urged upwardly and the screw 71 is pressed into the groove 62 of the sprocket 16. In this position the sprocket 16 is in driving engagement with the gear 68. This gear 68 is connected to the shaft 63 by the set screw 65. The hollow shaft 63 is formed at its bottom end with a slot 124 through which the screw member 71 extends. When the sprocket 16 is to be uncoupled from the hollow shaft 63, the pressure knob 66 is pressed downwardly to a distance sufficient to move the screw 71 out of the groove 62. Fig. 11 shows a plunger 184 slidably carried by the housing 1 and supported by a leaf spring to be moved against the influence of this leaf spring downwardly by the operator into engagement with the knob 66. In this uncoupled position of the sprocket 16 the film 10 wound on the take-up spool 17 can be rewound onto the supply spool. The friction spring 74 maintains the film taut during rewinding.

Fig. 13 shows, in addition to the manner in which shaft 18 extends into the container 48, the friction spring 102 housed within the motion transmitting coupling member 101 and pressing the pins 125 fixed to member 101 against the surface of an annular groove formed in the shaft 18 so that in this way the shaft 18 and counter disc 7 can be turned by the gearing 68, 85, 75 and at the same time the counter disc 7 may be adjusted independently, as described below. This arrangement permits the spool 17 to compensate for the increasing diameter of the film 10 while the sprocket 16 uniformly advances the film. The one-way drive spring 69 prevents reverse movement. The gears 68 and 75 which mesh with the gear 85 in the embodiments of Figs. 13 and 14 are respectively fixed to the shafts 63 and 18. Furthermore the shaft 63 is fixed to the motion transmitting coupling member 59. The film is transported by cooperation of coupling 59 with the coupling 57 of the drive 115 (Figs. 2 and 39) when the magazine 11, 13 is in the camera housing.

The counter disc 7 is independently adjustable since it is only frictionally connected with shaft 18. Thus, as may be seen from Fig. 11, the screw member 84 extends through an opening of the disc 7 into threaded engagement with the shaft 18, and the disc 7 is pressed upwardly against the head of screw 84 by the spring 83 coiled about the top end of shaft 18 and pressing with its bottom end against a collar 82 fixed to the shaft 18. Therefore, since the screw 84 cannot turn with respect to shaft 18 while the disc 7 can turn with respect to the screw 84, the spring 83 serves to frictionally connect disc 7 with the screw 84 for turning movement together with the latter and the shaft 18. However, the disc 7 may at any time be manually turned with respect to the shaft 18.

Fig. 15 shows a special form of film cartridge 15 which in this case is made up of two drums 87 and 15, the drum 87 being provided with a slot 88 (Figs. 16 and 17) and this drum 87 having a motion transmitting coupling member 89 which mates with a turnable coupling member 86 turnably carried by the housing 1 and pivotally connected to the auxiliary member 90 which cooperates with the bar 28 in the manner shown most clearly in Figs. 16 and 17. In Fig. 15 the button 32 is in its C position. In this position the exposure aperture 24 is open and the slot 88 of drum 87 is aligned with the exit opening 126 of the cartridge 15 so that the film can freely move into or out of the drum 87. Fig. 17 shows this position of the parts as seen from above. Fig. 16 shows the position of the parts when the exposure aperture 24 is closed and the slot 88 of the drum 87 is turned with respect to opening 126 through approximately 130°. In this position the film cartridge is closed. It is apparent from Figs. 16 and 17 that when the bar 28 moves from the position of Fig. 16 to that of Fig. 17 the pin of bar 28 which extends through the elongated slot of member 90 engages this member 90 near the end of the movement of bar 28 to shift member 90 and turn drum 87 from the position of Fig. 16 to that of Fig. 17. On the return movement of bar 28 to the position of Fig. 16 the member 90 will be returned to the position of Fig. 16 to close the cartridge.

Figs. 18-20 show an arrangement similar to that of Figs. 15-17 except that instead of auxiliary member 90 which is linked to the coupling member 86, a rack 95 meshes with teeth 97 formed on element 86. Furthermore these figures show how the flexible screen means 114 is guided in the channel 127 formed in the wall 38 of the magazine.

Figs. 22-26 have been discussed above.

Figs. 27-30 show an arrangement where the bar 28 is replaced by a gear 109 which is manually turnable with the handle 108 located at the exterior of the camera and turnable from the position of Figs. 27 and 29 to a position located against the bottom wall of the camera housing in a recess thereof. The gear 109 meshes with a gear 110 which in turn meshes with a rack 111. This rack 111 engages the auxiliary bar 112 in a position of the parts shown in Fig. 28 to advance the bar 112 to the right where it blocks raising of lock member 25 for the purpose described above. The bar 112 is under the influence of a spring 113 which shifts the bar 112 from the position of Fig. 28 to the position of Fig. 30 when the gear 109 is turned to shift rack 111 from the position of Fig. 28 to the position of Fig. 30. Shifting of the rack 111 opens and closes the aperture 24 in the same way as shifting of the bar 28. The positions O and C of gear 109 correspond to these same positions of the bar 28.

Fig. 31 illustrates the manner in which film is transported between a pair of cartridges 15. In distinction to the other embodiments of the invention, in Fig. 31 the film characteristic indicating disc 6 is located at the top left of the container and is connected to a flange 128 against which a friction spring 103 presses. This flange 128 serves at the same time as a bearing for one of the film cartridges 15. The gearing of the embodiment of Fig. 31 is the same as that of Figs. 13 and 14.

Fig. 33 shows an elongated pin 107 which carries a knife 106 which extends through an elongated slot of a tube 129 in which the pin 107 slides so that when the pin 107 is raised the part of film 10 located in the path of blade 106 is cut.

Fig. 35 shows the shaft 202 which carries the rewinding knob 37. A spring 104 urges the shaft 202 and knob 37 downwardly from the position of Fig. 36 to that of Fig. 35. As is apparent from Figs. 36 and 35 the shaft 202 carries a coupling member 105 at its bottom end, and this coupling member meshes with the coupling member at the top end of the rewinding shaft 33, the latter extending into the magazine 11, 13 and being coupled to a film cartridge 15 therein. Thus, during transportation of the film the rewinding knob 37 turns with the shaft 33 and enables the operator to observe the film movement. Of course, the knob 37 is manually turned in an opposite direction for rewinding.

It is also possible with the magazine of the invention to rewind the film when the magazine 11, 13 is out of the camera housing 1, 2, and Figs. 37 and 38 illustrate this feature. As is evident from Figs. 37 and 38, the shaft 33 has a hand crank fixed thereto and therefore forming part of the magazine. This hand crank has a handle 39 turnable from the inoperative dotted line position shown in Fig. 37 to the solid line operative position which enables the operator to rewind the film even if the magazine is not mounted in the camera.

Fig. 39 shows a magazine 11, 13 in section as seen from the rear with a film cartridge 15 located therein, and in Fig. 39 the magazine is shown provided with a pair of one-way drive springs 69 and 130. The spring 69 is fixed at one end to a turnable plate 131 which is prevented from turning in its operative position by a springy pin 132. This pin 132 can be moved out of the notch of plate 131 into which it extends by depression of the knob 133 against the influence of the leaf spring 134 which carries the pin 132, and when the pin 132 is thus located out of engagement with plate 131 rewinding of the film 10 into the cartridge 15 is possible.

Figs. 39 and 40 also show a safety device which prevents accidental opening of the magazine 11, 13 when the film 10 is in the magazine and not yet ready to be removed therefrom. For this purpose a feeler lever 158 is located in the magazine 11, 13 and is turnable about the shaft 18, as shown in Figs. 39 and 40. Thus, the shaft 18 forms a bearing 160 for the lever 158. A spring 159 carried by the wall 13 of the magazine, as shown in Fig. 40, bears with its free end against the lever 158 to urge the latter in a clockwise direction, as viewed in Fig. 40. This lever 158 is provided with an arm 161 extending to the right beyond the shaft 18, as viewed in Figs. 39 and 40, and the spring 159 urges the opposite end of lever 158 against the film 10 which moves to the spool 17.

The rear wall 13 of the magazine is hinged at 12 to the front wall 11 and opposite its hinged end is provided with a channel in which a lock member 19 is located, this lock member 19 in its locking position extending downwardly into an opening in the bottom wall of the magazine to prevent movement of rear wall 13 to its open position until the lock member 19 is manually raised. The open position of lock member 19 is indicated in dotted lines in Fig. 39 opposite the letter O and it is shown in solid lines in its closed position where the top end of the member 19 is shown opposite the letter C. The lock member 19 carries a leaf spring 162 having a top free end, and a knob 163 extends through an opening of the lock member 19 and is fixed to the leaf spring 162 adjacent its top end. The shank of the knob 163 extends through a slot 165 formed in the channel portion 164 of rear wall 13 in which the lock member 19 rides.

When film 10 is in the magazine the arm 161 has the position shown in solid lines in Fig. 40. Thus the arm 161 is located directly over the top end of leaf spring 162 and therefore the lock member 19 cannot be raised to its open position. When the film has to be rewound, it moves from spool 17 back to cartridge 15, and when all of the film has left the spool 17 the spring 159 turns the lever 158 to the dotted line position shown in Fig. 40 where it engages the shaft 167 of sprocket 16. In this dotted line position shown in Fig. 40 the arm 161 is no longer located over the leaf spring 162 and the lock member 19 may then be raised to unlock the rear wall 13 of the magazine so that the latter can be opened.

In the event that difficulties arise requiring opening of the magazine when the film 10 extends across the exposure aperture 24 of the magazine, the knob 163 can be pulled out by the operator to locate the top end of the leaf spring 162 to the right of arm 161, as viewed in Figs. 39 and 40, and in this way the magazine may be manually unlocked at any time. If desired the lever 158 may be arranged to feed the film 10 at the position T shown in Fig. 40 just to the right of the cartridge 15.

The structure of the invention also includes the following features:

A support 35 is provided for the magazine 11, 13, as shown in Fig. 2. The film cartridge 15 is located in the portion 38 of the magazine as shown in Fig. 3. The portion 38 may have its wall formed at a channel 127 for the screen 114, as described above and shown in Figs. 18-20. The pressure plate 40 is acted on by the spring 41 to hold the film 10 in a plane. The cover 53 shown in Fig. 7 is held shut by the spring 47. According to Fig. 13 a container 48 may itself be turned upwardly. As is shown in Figs. 15–17 springs 91 releasably retain the cover plates 26 and 27 or the sheet 114 against accidental opening in cooperation with the catch members 92.

It will be understood that each of the elements described above, or two or more together, may also find a useful application in other types of cameras differing from the types described above.

While we have illustrated and described the invention as embodied in cameras with removable magazines, we do not intend to be limited to the details shown, since various modifications and structural changes may be made without departing in any way from the spirit of our invention.

Without further analysis, the foregoing will so fully reveal the gist of our invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What we claim as new and desire to secure by Letters Patent is:

1. In a camera, in combination, a camera housing formed with a rear opening giving access to the interior of the camera; a rear wall hinged to said housing and having an operative position closing said opening and an inoperative position uncovering said opening; a magazine located in said housing and being removable through said opening when said rear wall is in its inoperative position, said magazine being formed with an aperture through which film in the magazine may be exposed and said magazine having a spool-accommodating chamber and including an opaque screen means in the form of an elongated flexible self-sustaining sheet movably carried by said magazine for movement between a closed position closing said aperture and an open position opening said aperture and extending at least in part around said chamber; means operatively connected to said screen means for moving said screen means to its open position and locking said rear wall in its operative position, on the one hand, and for moving said screen means to its closed position and releasing said rear wall for movement to its inoperative position, on the other hand; and spring means between said magazine and rear wall, when the latter is in its operative position, for urging said magazine toward the front of said housing in a direction parallel to the optical axis.

2. In a camera, in combination, a camera housing formed with an opening giving access to the interior of the camera; closure means having an operative position closing said opening and an inoperative position uncovering said opening; a magazine located in said housing and being removable through said opening when said closure means is in its inoperative position, said magazine being formed with an aperture through which film in the magazine may be exposed and said magazine including an opaque screen means movably carried by said magazine for movement between a closed position closing said aperture and an open position opening said aperture; and film transporting means carried by said camera housing and said magazine and including a pair of coupling members respectively carried by said camera housing and magazine and having a common turning axis, said coupling members respectively having end faces directed toward each other and parallel to a plane normal to said common axis and passing through said opening of said camera housing and said coupling members respectively having peripheral portions parts of which are directed toward said opening of said camera housing at all angular positions of said coupling members, one of said coupling members being formed in said end face thereof with an elongated recess which is open at only one end located at the periphery of said one coupling member and the other of said coupling members having an elongated projection extending beyond its end face into said recess and movable into the latter recess only longitudinally thereof through said one open end thereof to provide driving engagement between said coupling members.

3. In a camera, in combination, a camera housing formed with an opening giving access to the interior of the camera; closure means having an operative position closing said opening and an inoperative position uncovering said opening; a magazine located in said housing and being removable through said opening when said closure means is in its inoperative position, said magazine being formed with an aperture through which film in the magazine may be exposed and said magazine including an opaque screen means movably carried by said magazine for movement between a closed position closing said aperture and an open position opening said aperture; means operatively connected to said screen means for moving said screen means to its open position and locking said closure means in its operative position, on the one hand, and for moving said screen means to its closed position and releasing said closure means for movement to its inoperative position, on the other hand; releasable lock means locking said magazine until film therein has been unwound from and rewound on a supply spool in the magazine; and means for manually releasing said releasable lock means at any desired time.

4. In a camera, in combination, a camera housing having a rear wall turnable to and from a closed position closing said housing, said housing having a front wall and having its interior walls between which the optical axis is located, the latter walls being fixed to and extending rearwardly from said front wall and being parallel to said axis, and an additional wall in said housing parallel to said front wall thereof, formed with an exposure aperture, and fixedly carried by said rearwardly extending walls, said additional wall having a rearwardly directed flat surface located in a plane normal to the optical axis; a magazine movable into said housing when said rear wall is away from said closed position thereof and having a front surface surrounding an exposure aperture of the magazine, said magazine fixedly carrying a plurality of pins distributed about the optical axis and extending forwardly from said front surface of said magazine into engagement with said rearwardly directed flat surface, said pins being aligned with said rearwardly extending walls which are parallel to said axis; and spring means located between said rear wall and said magazine when said rear wall is in its closed position and urging said magazine forwardly along said axis so as to press said pins against said flat surface.

5. In a camera, in combination, a camera housing having a rear wall turnable to and from a closed position closing said housing, said housing having in its interior at least three rearwardly directed flat surface portions located in a common plane normal to the optical axis and distributed about said axis; a magazine movable into said housing when said rear wall is away from said closed position thereof, said magazine having a front wall portion surrounding an exposure aperture of the magazine and fixedly carrying a plurality of pins which respectively engage said flat surface portions to precisely determine the location of the magazine along said optical axis; spring means located between said rear wall and magazine when said rear wall is in its closed position and urging said magazine forwardly along said axis so as to press said pins respectively against said flat surface portions in said housing; and adjusting means cooperating with said pins for adjusting the extent to which they extend forwardly from said front wall portion of said magazine so as to adjust the position of the latter along the optical axis.

References Cited in the file of this patent

UNITED STATES PATENTS

| | | | |
|---|---|---|---|
| 2,008,110 | Scheibell | July 16, | 1935 |
| 2,011,350 | Wittel | Aug. 13, | 1935 |
| 2,022,362 | Porter | Nov. 26, | 1935 |
| 2,293,195 | Cohen | Aug. 18, | 1942 |
| 2,553,656 | Kirby | May 22, | 1951 |
| 2,588,954 | Bornemann et al. | Mar. 11, | 1952 |
| 2,624,233 | Foster | Jan. 6, | 1953 |
| 2,721,506 | Kindig et al. | Oct. 25, | 1955 |
| 2,771,825 | Naumann | Nov. 27, | 1956 |

FOREIGN PATENTS

| | | | |
|---|---|---|---|
| 834,548 | France | Oct. 22, | 1938 |
| 900,980 | France | July 13, | 1945 |
| 933,275 | France | Dec. 17, | 1947 |
| 255,723 | Switzerland | July 15, | 1948 |
| 694,571 | Great Britain | July 22, | 1953 |